United States Patent
Silver Rosner et al.

(10) Patent No.: US 10,713,653 B2
(45) Date of Patent: *Jul. 14, 2020

(54) ANONYMIZED ACCESS TO ONLINE DATA

(71) Applicant: American Express Travel Related Services Company, Inc., New York, NY (US)

(72) Inventors: Wendy Silver Rosner, Vienna, VA (US); James R. Shelby, New York, NY (US); Jackie S. Yong, Phillipsburg, NJ (US); Jean Bowman, Cave Creek, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 839 days.

This patent is subject to a terminal disclaimer.

(21) Appl. No.: 15/298,063

(22) Filed: Oct. 19, 2016

(65) Prior Publication Data
US 2017/0039555 A1    Feb. 9, 2017

Related U.S. Application Data

(63) Continuation of application No. 14/570,428, filed on Dec. 15, 2014, now Pat. No. 9,501,662, which is a
(Continued)

(51) Int. Cl.
*G06Q 30/00* (2012.01)
*G06F 7/04* (2006.01)
(Continued)

(52) U.S. Cl.
CPC ..... *G06Q 20/3821* (2013.01); *G06F 21/6245* (2013.01); *G06F 21/6254* (2013.01);
(Continued)

(58) Field of Classification Search
CPC ............ G06F 21/6245; G06F 21/6254; G06F 21/6263; G06Q 20/34; G06Q 20/3821;
(Continued)

(56) References Cited

U.S. PATENT DOCUMENTS 6,055,573 A  *  4/2000  Gardenswartz ........ G06Q 30/02
                                                    709/219
6,233,567 B1 *  5/2001  Cohen ..................... G06F 21/10
                                                     705/59

(Continued)

OTHER PUBLICATIONS

"Hashing function," Dictionary of Computing, A&C Black Publishers, 2002, 1 page.
(Continued)

*Primary Examiner* — Michael Simitoski
(74) *Attorney, Agent, or Firm* — Greenberg Traurig, LLP (57) ABSTRACT

Customer online data is collected via script on customer computers and is communicated to a server hosted by an organization, such as a card issuer. The customer online data communicated to the server is non-personally identifiable information (non-PII). In turn, the server aggregates the non-PII customer online data from the set of participating merchants. The server associates the received non-PII customer online data with non-PII demographic data. Other non-PII transaction data, such as previous transactions processed at a card issuer, also can be associated with the non-PII customer online data and non-PII demographic data. These associations are, in turn, used to create reports and to provide services to help merchants or other requesting organizations develop online strategies to drive click thru and conversion rates.

20 Claims, 4 Drawing Sheets

Related U.S. Application Data continuation of application No. 12/712,355, filed on Feb. 25, 2010, now Pat. No. 8,935,797.

(51) Int. Cl.
| | |
|---|---|
| *H04L 29/06* | (2006.01) |
| *G06Q 20/38* | (2012.01) |
| *G06Q 30/06* | (2012.01) |
| *G06Q 30/02* | (2012.01) |
| *G06F 21/62* | (2013.01) |
| *G06Q 20/34* | (2012.01) |

(52) U.S. Cl.
CPC ......... *G06F 21/6263* (2013.01); *G06Q 20/34* (2013.01); *G06Q 20/3827* (2013.01); *G06Q 30/02* (2013.01); *G06Q 30/0253* (2013.01); *G06Q 30/0255* (2013.01); *G06Q 30/0615* (2013.01); *H04L 63/0421* (2013.01); *H04L 63/06* (2013.01)

(58) Field of Classification Search
CPC .............. G06Q 20/3827; G06Q 30/02; G06Q 30/0253; G06Q 30/0255; G06Q 30/0615; H04L 63/0421; H04L 63/06
See application file for complete search history.

(56) References Cited

U.S. PATENT DOCUMENTS

| | | | |
|---|---|---|---|
| 6,298,330 B1 | 10/2001 | Gardenswartz | |
| 6,415,322 B1* | 7/2002 | Jaye | G06Q 30/02 379/127.01 |
| 6,839,680 B1 | 1/2005 | Liu et al. | |
| 6,973,436 B1* | 12/2005 | Shkedi | G06Q 30/02 705/14.44 |
| 6,983,379 B1 | 1/2006 | Spalink | |
| 7,162,436 B1 | 1/2007 | Eckel, Jr. | |
| 7,203,315 B1 | 4/2007 | Livesay | |
| 7,213,032 B2 | 5/2007 | Mascarenhas | |
| 7,260,837 B2 | 8/2007 | Abraham | |
| 7,428,493 B2* | 9/2008 | Shkedi | G06Q 30/02 705/35 |
| 7,493,655 B2 | 2/2009 | Brown | |
| 7,725,944 B2* | 5/2010 | Spalink | G06F 21/6254 705/74 |
| 7,853,782 B1* | 12/2010 | Geddes | G06F 21/33 705/78 |
| 7,930,252 B2 | 4/2011 | Bender et al. | |
| 8,468,271 B1 | 6/2013 | Panwar et al. | |
| 8,515,791 B2 | 8/2013 | Woda | |
| 8,738,418 B2 | 5/2014 | Winters | |
| 8,739,271 B2 | 5/2014 | Schultz et al. | |
| 8,768,943 B2 | 7/2014 | Puttaswamy | |
| 9,070,138 B2* | 6/2015 | Abraham | G06Q 30/02 |
| 9,172,679 B1* | 10/2015 | Geddes | H04L 63/0281 |
| 2001/0049620 A1 | 12/2001 | Blasko | |
| 2002/0099824 A1 | 7/2002 | Bender | |
| 2002/0112013 A1 | 8/2002 | Walsh | |
| 2002/0128925 A1 | 9/2002 | Angeles | |
| 2003/0028481 A1* | 2/2003 | Flitcroft | G06Q 20/00 705/39 |
| 2003/0163416 A1 | 8/2003 | Kitajima | |
| 2004/0024632 A1 | 2/2004 | Perry | |
| 2004/0139025 A1 | 7/2004 | Coleman | |
| 2005/0210135 A1 | 9/2005 | Abrahams et al. | |
| 2006/0004772 A1 | 1/2006 | Hagan et al. | |
| 2006/0070117 A1 | 3/2006 | Spalink et al. | |
| 2006/0179003 A1 | 8/2006 | Steele et al. | |
| 2006/0200480 A1* | 9/2006 | Harris | G06Q 30/06 |
| 2006/0265495 A1 | 11/2006 | Butler et al. | |
| 2006/0274896 A1 | 12/2006 | Livesay | |
| 2007/0038516 A1 | 2/2007 | Apple | |
| 2007/0244746 A1 | 10/2007 | Issen | |
| 2008/0033833 A1* | 2/2008 | Senior | G06Q 20/203 705/37 |
| 2008/0040224 A1 | 2/2008 | Roker | |
| 2008/0040225 A1 | 2/2008 | Roker | |
| 2008/0086365 A1 | 4/2008 | Zollino | |
| 2008/0086764 A1* | 4/2008 | Kulkarni | G06F 21/33 726/7 |
| 2008/0091535 A1* | 4/2008 | Heiser, II | G06Q 30/02 705/14.45 |
| 2008/0133349 A1 | 6/2008 | Nazer et al. | |
| 2008/0147883 A1 | 6/2008 | Philyaw | |
| 2008/0162362 A1* | 7/2008 | Moinuddin | G06Q 20/10 705/71 |
| 2008/0162371 A1 | 7/2008 | Rampell et al. | |
| 2008/0167946 A1 | 7/2008 | Bezos | |
| 2008/0215976 A1 | 9/2008 | Bierner et al. | |
| 2009/0094158 A1 | 4/2009 | Fein et al. | |
| 2009/0144201 A1 | 6/2009 | Gierkink | |
| 2009/0234708 A1 | 9/2009 | Heiser, II | |
| 2009/0234715 A1 | 9/2009 | Heiser et al. | |
| 2009/0327488 A1 | 12/2009 | Sampat et al. | |
| 2010/0094758 A1 | 4/2010 | Chamberlain et al. | |
| 2010/0180013 A1* | 7/2010 | Shkedi | H04L 67/10 709/219 |
| 2010/0333178 A1 | 12/2010 | Suthoff | |
| 2011/0060652 A1* | 3/2011 | Morton | H04W 4/043 705/14.58 |
| 2012/0101911 A1 | 4/2012 | Shiloh | |
| 2012/0150641 A1 | 6/2012 | Dobbs et al. | |

OTHER PUBLICATIONS

Office Action dated Aug. 29, 2012, U.S. Appl. No. 12/712,355.
Office Action dated Feb. 19, 2013, U.S. Appl. No. 12/712,355.
Office Action dated Aug. 29, 2013, U.S. Appl. No. 12/712,355.
Office Action dated May 21, 2014, U.S. Appl. No. 12/712,355.
Notice of Allowance dated Sep. 11, 2014, U.S. Appl. No. 12/712,355.
Corrected Notice of Allowability dated Dec. 9, 2014, U.S. Appl. No. 12/712,355.
USPTO; Office Action dated Apr. 21, 2016, U.S. Appl. No. 14/570,428.
USPTO; Notice of Allowance dated Sep. 28, 2016, U.S. Appl. No. 14/570,428.
USPTO; Corrected Notice of Allowability dated Oct. 19, 2016, U.S. Appl. No. 14/570,428.
Camp, L. Jean, and Carlos A. Osorio. "Privacy-enhancing technologies for internet commerce." Trust in the Network Economy (2003): 317-331.
Wibowo, Arrianto Mukti, Kwok Yan Lam, and Gary SH Tan. "Loyalty program scheme for anonymous payment systems." Electronic Commerce and Web Technologies. Springer Berlin Heidelberg, 2000. 253-265.

* cited by examiner

ANONYMIZED ACCESS TO ONLINE DATA

CROSS-REFERENCE TO RELATED APPLICATIONS

This application is a continuation of, claims priority to and the benefit of, U.S. Ser. No. 14/570,428 filed Dec. 15, 2014 and entitled "SYSTEM AND METHOD FOR ONLINE DATA PROCESSING." The '428 application is a continuation of, claims priority to and the benefit of, U.S. Ser. No. 12/712,355 filed Feb. 25, 2010 and entitled "SYSTEM AND METHOD FOR ONLINE DATA PROCESSING" (aka U.S. Pat. No. 8,935,797 issued Jan. 13, 2015). Both of which are hereby incorporated in their entirety.

BACKGROUND OF THE INVENTION

Field of the Invention

The present invention generally relates to processing and reporting demographic and transaction customer data, and more particularly to providing demographic and transaction data to a merchant based on transactions at, and beyond the merchant's own business, while protecting the privacy of customers.

Related Art

In the context of online shopping, click-through and conversion rates are two methods for measuring the performance of a website or the success of an online advertising campaign. A click-through rate is the number of users who clicked-on (i.e., selected) an advertisement on a web page divided by the number of times the advertisement was delivered (i.e., the number of impressions presented). A conversion rate is the ratio of users who convert content views or website visits into desired actions.

Surveys are sometimes used by merchants to correlate demographic and other segmentation information to develop online strategies that improve click-through and conversion rates. However, many merchants do not reach this goal because their online strategies are based on unreliable and hypothetical demographic data provided by such surveys.

One type of survey merchants use is designed to match demographic and other segmentation information to feedback from users regarding online advertising campaigns. However, this type of survey data can be unreliable due to "self selection". Self-selection is a term used to indicate any situation in which individuals select themselves into a group, causing a biased sample. In many cases self-selection makes it difficult to evaluate programs, to determine whether the program has some effect, and to do market research because of these biases.

Another way in which merchants seek to improve click-through and conversion rates is by targeting their advertising and developing online strategies based on how site visitors behave, for example, by analyzing click-through patterns. While such behavioral targeting is generally considered useful, it still often fails to provide merchants with sufficient demographic and transaction data needed to create a robust online strategy.

Demographic data on visitors of a particular merchant website also is available. This type of data has been found to be limited, however, primarily because it lacks a correlation between the demographic data of customers and transaction data beyond the particular merchant's website from which the survey was administered. Moreover, tracking when a customer views a product at a particular merchant's website, abandons purchasing the product, and later purchases that product from a competitor requires specialized software applications.

In addition to the above challenges, customers are typically adverse to data aggregation regarding their actions and behaviors, online or otherwise. Such privacy concerns, can cause people to respond inaccurately or simply not participate in a survey.

As a result of the foregoing, merchants are hindered from acquiring rich demographic and transaction data associated with transaction data at, and beyond the particular merchant's own business, while protecting the privacy of the customers.

BRIEF DESCRIPTION OF THE INVENTION

The present invention meets the above-identified needs by providing a system, method and computer program product for providing reliable demographic and transaction data to a merchant based on transactions at, and beyond the merchant's own business, while protecting the privacy and compete anonymity of the customers.

In one embodiment a method and computer readable medium are provided for processing online data. First data, a first identifier, and a second identifier are received from a data source. The first identifier is established as personally identifiable information (PII) by the data source. The second identifier is established as non-personally identifiable information (non-PII) by the data source. The second identifier is associated with a third identifier that is non-PII. The first data, second identifier, and third identifier are all sent to a first service.

In another embodiment, a system for processing online data is provided. The system includes a network interface unit and a first server. The network interface unit is configured to receive first data, a first identifier, and a second identifier from a data source. The first identifier is established as personally identifiable information (PII) by the data source. The second identifier is established as non-personally identifiable information (non-PII) by the data source. The first server is configured to associate the second identifier with a third identifier that is non-PII. The first server is also configured to send the first data, second identifier, and third identifier to a second server.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the drawings.

DETAILED DESCRIPTION

The present invention is directed to a system, method and computer program product for providing merchants with demographic and transaction data associated with transaction data at, and beyond the merchant's own business, while protecting the privacy of the customers. Generally, a set of participating merchants that agree to collect customer online data is established. Each participating merchant includes an instruction within its web pages requesting their customers' web browsers to download a script from a web server that is distinct from the one or more servers providing the merchants' web pages. While a customer browses a particular merchant's web site, the web server collects customer online data via the downloaded script, such as records of customer web site visits, without collecting personally identifiable information (PII) data. Such data is referred to herein generally as non-personally identifiable information (non-PII) data. Different types of non-PII data, including non-PII online data, non-PII transaction data, non-PII demographic data, and a unique user identifier (ID), will be described below in more detail.

The web server communicates the collected customer online data to a reporting server hosted by an organization, such as a card issuer.

The reporting server associates the received non-PII customer online data with non-PII demographic data. Other non-PII transaction data, such as previous transactions processed at a card issuer, also can be associated with the non-PII customer online data and non-PII demographic data. These associations are, in turn, used to create reports and provide services to help merchants or other requesting organizations develop online strategies.

Reports and services are tailored to a requestor's needs. For instance, a merchant could request a report on the demographics of visitors that abandoned their shopping carts.

Each customer's privacy is preserved because customer online data is not associated with PII data at any point between the collection of customer online data, and the creation of reports and/or the providing of services based on the customer online data. In other words, a particular individual cardmember is not associated with his or her online data.

The terms "user," "customer," "cardmember," and/or the plural form of these terms are used interchangeably throughout herein to refer to those persons or entities capable of accessing, using, being affected by and/or benefiting from the present invention.

A "merchant" as used herein refers to any person, organization, distributor system, software and/or hardware that is a provider, broker and/or any other organization in the distribution chain of goods, services, content, and the like. For example, a merchant may be a grocery store, a retail store, a travel agency, a service provider, an on-line merchant or the like. The term "vendor" is sometimes used interchangeably with the term "merchant".

A "card" as used herein refers to both "open cards" and "closed cards." "Open cards" are financial transaction cards that are generally accepted at different merchants. Examples of open cards include the AMERICAN EXPRESS, VISA, MASTERCARD, and DISCOVER Cards, which may be used at many different retailers and other businesses. In contrast, "closed cards" are financial transaction cards that may be restricted to use in a particular store, a particular chain of stores or a collection of affiliated stores. One example of a closed card is a pre-paid gift card that may only be purchased at, and only be accepted at, a clothing retailer, such as The GAP store.

An "account" as used herein refers to an account associated with an open account or a closed account system. The account may exist in a physical or non-physical embodiment. For example, an account may be distributed in non-physical embodiments such as an account number, frequent-flyer account, telephone calling account or the like. Furthermore, a physical embodiment of a transaction account may be distributed as a financial instrument.

A "card issuer" and "issuer" as used herein refer to an organization that issues a transaction account and associated financial instrument (e.g., payment device, transaction card, and the like) to a cardmember. They also are responsible for maintaining details of the cardmember's account including eligibility for services, payments made, charges incurred, and the like.

A "card number" or "account number", as used herein, includes any device, code, or other identifier suitably configured to allow a cardmember to interact or communicate with an issuer.

"Personally identifiable information" (PII) as used herein refers to data that a customer, merchant, card issuer or the like wishes to keep confidential, such as a social security number (SSN), a card number, address information, phone number, email address, and the like.

"Non-personally identifiable information" (non-PII) as used herein refers to data that is not PII.

A "service" or "web service" as used herein refers to one or more software components, hardware components, or any combination thereof, associated with providing, receiving, and/or interfacing with data over a network.

"Demographic data" as used herein refers to data associated with one or more characteristics of one or more persons.

"Transaction data" as used herein refers to data associated with an action and/or communication.

"Customer online data" and "online data" as used herein refers to data associated with actions and/or communications occurring on and/or in conjunction with a network.

A "tracking script" and "script" as used herein refers to any data that includes a computing instruction.

Figure 1:
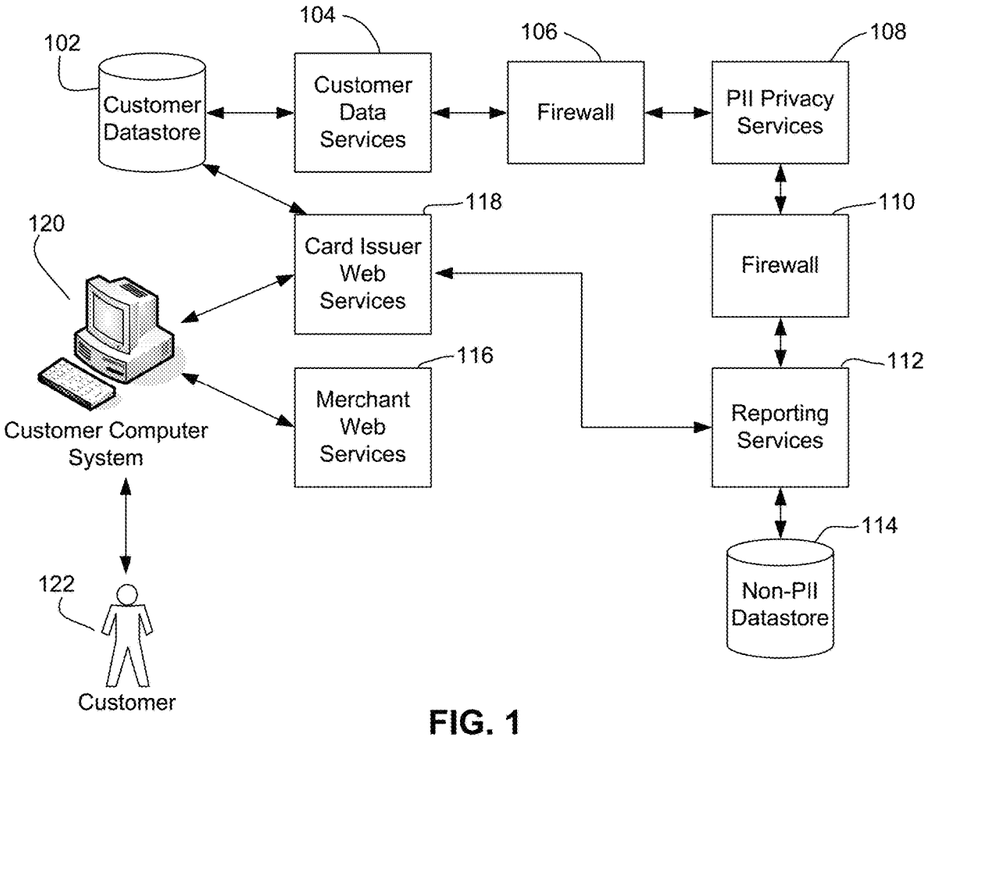
FIG. 1 is a collaboration diagram of functional modules deployed on one or more computer systems for providing demographic and transaction data in one embodiment of the present invention.
Figure 2:
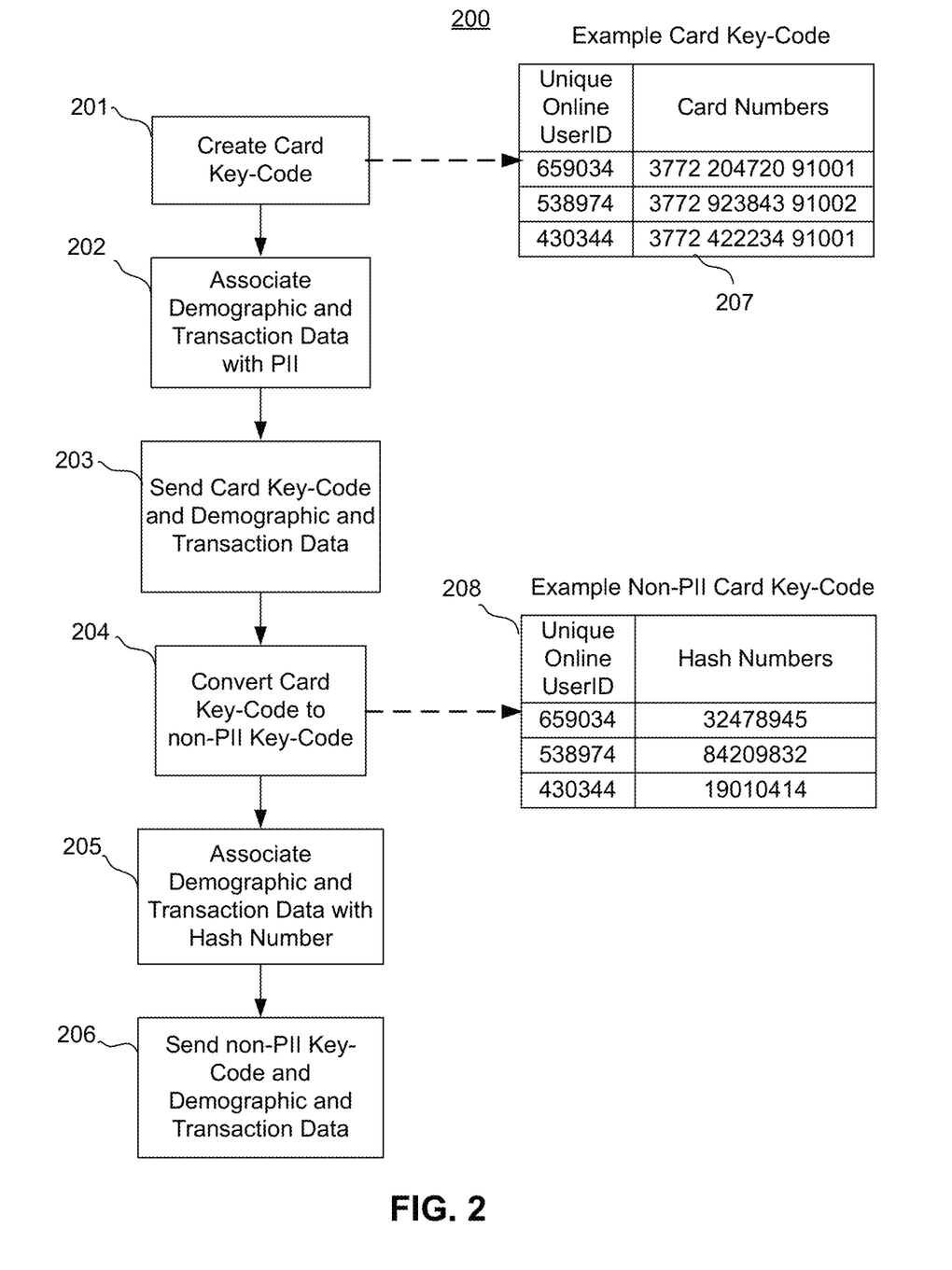
FIG. 2 is a flowchart illustrating a privacy data receiving process in one embodiment of the present invention.
Figure 3:
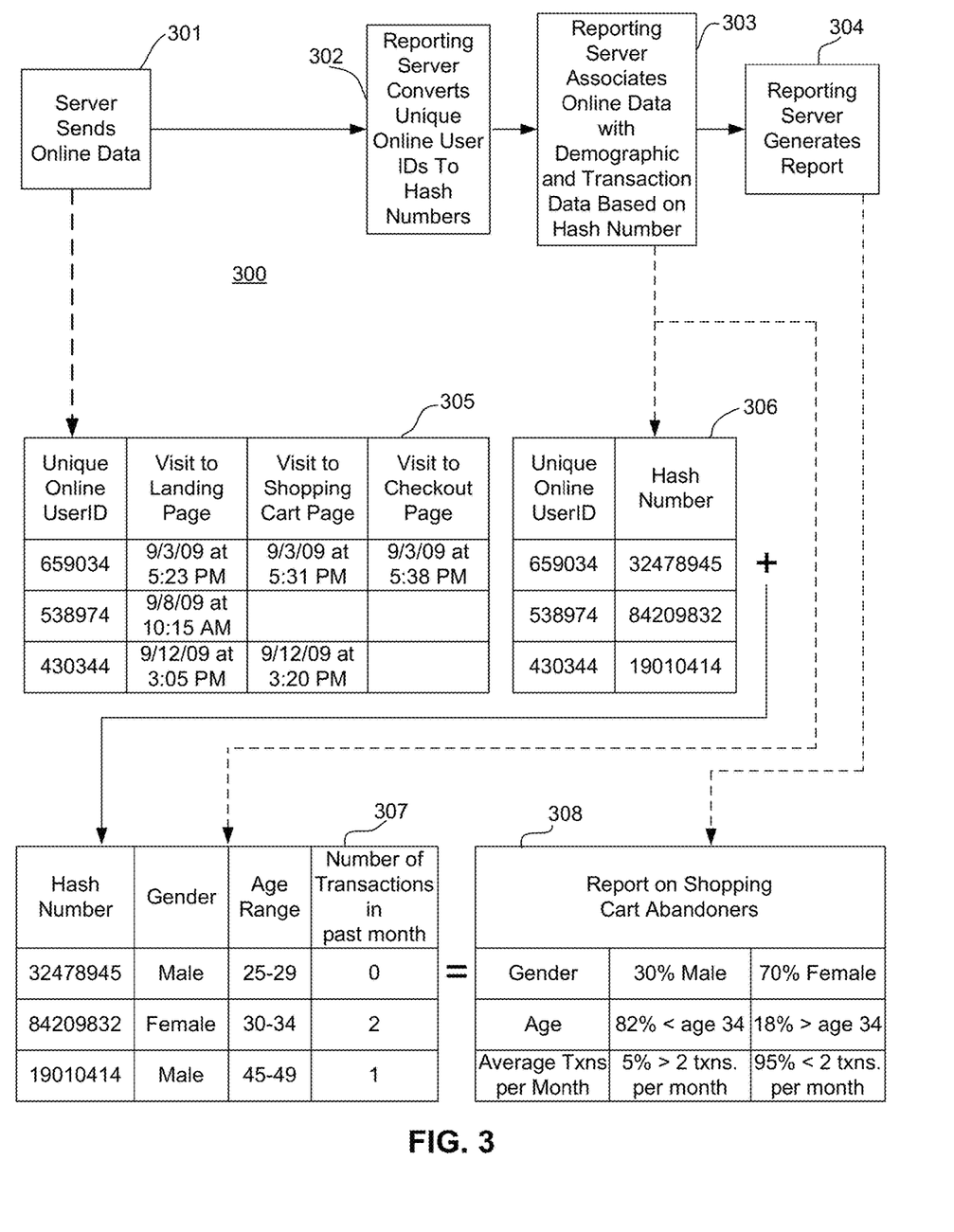
FIG. 3 is a flowchart illustrating an online data receiving and reporting process in one embodiment of the present invention.

The individual logic units of decisioning/orchestration units, and processes described below (i.e., blocks 102-120, and processes 200 and 300) may be implemented in one or more computer systems, servers, or other processing systems. In addition, units 102-120, and processes 200 and 300 can be operated and controlled by one or more card issuer systems, third party systems, or a combination of each.

FIG. 1 is a collaboration diagram of functional modules deployed on one or more computer systems for providing demographic and transaction data in accordance with an embodiment of the present invention.

Reporting services 112 generate reports and provide services that are tailored based on requests from merchants and other requesting organizations. To generate these reports and services, reporting services 112 receive demographic and transaction data from a data source, such as customer data services 104 (via PII privacy services 108), and receive online data from card issuer web services 118. The online data sent from card issuer web services 118 is based upon data associated with browsing merchant web services 116. As explained in more detail below, reporting services 112 is not provided access to PII data.

A process for receiving demographic and transaction data from a data source, such as customer data services 104 (via PII privacy services 108), at reporting services 112 is described first. A process for receiving online data from card issuer web services 118 at reporting services 112 are discussed later. As discussed below, the flow of data from both customer data services 104 and card issuer web services 118 is ongoing and can occur in real-time, on-demand, and/or at scheduled intervals, scheduled times, based on data collection thresholds, etc.

For one or more cardmembers of a card issuer, customer datastore 102 stores PII data, demographic data (non-PII), transaction data (non-PII), and a unique online user ID (non-PII). As explained above, PII data includes information such as a cardmember's card number, individual name, and address information. Demographic data includes, information such as age, income, home ownership, employment status, location data, and/or any other demographic characteristics.

Transaction data associated with a financial transaction includes, for example, information pertaining to transactions processed by the card issuer in connection with one or more respective cardmember accounts such as a transaction ID, price, product category, and the like.

A unique online user ID is a unique identifier associated with a cardmember in connection with enrolling the cardmember with card issuer web services 118. The functionality of web services 118, including how the services are used to enroll cardmembers, is discussed later.

The unique online user ID is non-PII and is generated based upon a random or pseudo random number, which is not derived from PII data. Hence, external to the databases of the card issuer which associate a cardmember's unique online user ID to a particular cardmember, mere possession of the unique online user ID alone will not allow a particular cardmember to be identified.

In customer datastore 102, the card number of each cardmember is associated with a respective cardmember's name and address information, demographic data, and transaction data. In addition, each card number is associated with a unique online user ID of the cardmember. As described below, prior to reporting services 112 receiving data from customer datastore 102 (via customer data services 104 and PII privacy services 108) and storing the received data in non-PII datastore 114, all associations between PII data (e.g., the cardmember's card number) and non-PII data are removed by PII privacy services 108.

Customer data services 104 are an interface between customer datastore 102 and PII data privacy services 108. As shown in FIG. 1, communications between customer data services 104 and PII data privacy services 108 occur through firewall 106.

Customer data services 104 generate a card key-code for one or more customers based on the data stored in customer datastore 102. For each customer, the card key-code includes at least one card number (PII) and at least one unique online user ID (non-PII). The card key-code also includes an association between the card number (PII) and the unique online user ID (non-PII) for each customer, respectively.

FIG. 2, shows an example card key-code 207, represented as a table. In example card key-code 207, each card-number-to-unique-online-user-ID association is indicated based on their existence in the same data record. A card key-code can be represented in any other format capable of indicating one or more card numbers, unique online user IDs, and the respective associations between each. Other formats may include, comma separated files, databases, and the like.

Customer data services 104 send the card key-code to PII data privacy services 108. In addition to sending the card key-code to PII data privacy services 108, customer data services 104 send, to PII data privacy services 108, the respective customer non-PII demographic and transaction data of each card number included in the card key-code, along with an indication of the particular card number the non-PII demographic and transaction data is associated with for a particular customer.

PII privacy services 108 receive the data sent from customer data services 104 and remove all PII data from the received data (e.g., the cardmember card numbers in this implementation).

For each card number contained in the card key-code, PII privacy services 108 generates a hash number. The hash number is distinct from the unique online user ID (non-PII) and is generated based upon a random or pseudo random number, which is not derived from PII data.

PII privacy services 108 convert the card key-code into a non-PII key-code by replacing each card number with one of the hash numbers generated by PII privacy services 108, and associating each respective unique online user ID (non-PII) previously associated to a respective card number, with a respective hash number. FIG. 2, shows an example non-PII key-code 208. PII privacy services 108 also associates the demographic and transaction data received from customer data services 104 with a respective hash number in lieu of a respective card number.

The non-PII key-code generated by PII privacy services 108, and the demographic and transaction data received from customer data services 104, but now associated with respective hash numbers in lieu of card numbers, are sent from PII privacy services 108 to reporting services 112. Reporting services 112 receive the non-PII key-code, and demographic and transaction data, and store each in non-PII datastore 114. As described further below, reporting services 112 associate the demographic and transaction data stored in non-PII datastore 114 with online data received from card issuer web services 118.

PII privacy services has access to the associations between (1) card numbers (PII), (2) unique online user IDs (non-PII), and (3) hash numbers (non-PII). However, customer data services 104 does not have access to the hash number associations, and reporting services 112 does not have access to the card number associations. Thus, cardmember privacy is preserved by prohibiting reporting services 112 access to cardmember PII data, and thereby prohibiting the ability to associate online data to a particular cardmember.

To ensure PII data is prohibited from reporting services 112, firewalls 106 and 110 enforce security policies that restrict access to the PII and non-PII data associations managed by PII privacy services 108. Specifically, the flow of PII data and PII data associations are restricted to those communications between customer data services 104 and PII privacy services 108. No PII data, nor PIT data associations are sent between PII privacy services 108 and reporting services 112.

The key-codes, demographic and transaction data, and respective data associations sent between customer data services 104, PII privacy services 108, and reporting services 112 are sent/received, synchronized and/or updated in real-time, on-demand, and/or at scheduled intervals, at scheduled times, at data collection/aggregation thresholds, etc., as desired.

In alternative embodiments, the above features based upon the PII data including a cardmember card number are implemented using PII data in addition to, or in lieu of, a cardmember card number. In such implementations, the above card number associations can include alternate and/or additional PII data associations, as desired. For instance, a cardmember's phone number may be used in lieu of, or in addition to, the cardmember's card number, and associated with demographic and transaction data.

Card issuer web services 118 provide web services to customers regarding their accounts with the card issuer such as accessing recent transactions and monthly statements, initiating a transaction dispute, and the like. Customer information required by these services is accessed from customer datastore 102.

When a customer 122 accesses card issuer web services 118 via a web browser on customer computer system 120, the customer 122 is provided with a card issuer web services 118 login and enrollment interface. As discussed above, enrollment of a customer 122 with card issuer web services 118 includes associating a unique user ID (non-PII) of customer 122 with a card number of customer 122. This association is stored in customer datastore 102 by card issuer web services 118.

Card issuer web services 118 has its own privacy policy distinct from the privacy policy of the account of customer 122 at the card issuer. During enrollment at card issuer web services 118, card issuer web services 118 provides the customer 122 with the opportunity to review the privacy policy of card issuer web services 118.

In addition, card issuer web services 118 provide the customer 122 with an explicit opt-in and/or opt-out option for allowing online data tracking via merchant websites in conjunction with a cookie containing a unique online user ID (non-PII) of the customer 122. The opt-in and/or opt-out selection of customer 122 is stored in customer datastore 102. The unique online user ID (non-PII) associated with a card number of customer 122 is placed in a tracking cookie.

In addition to the unique online user ID (non-PII), the tracking cookie indicates whether the customer 122 has selected to opt-in or opt-out of merchant online tracking. If the customer selects the opt-out option, then no online data is tracked in this fashion. If the customer selects the opt-in option, then online data is tracked when the tracking cookie exists on the computing device the customer is using to access/navigate a merchant's website.

Card issuer web services 118 send the tracking cookie to customer computer system 120 of the customer 122. The tracking cookie is associated with the domain of card issuer web services 118. Because the cookie is provided by the same domain that it is associated with (e.g., card issuer web services 118), the tracking cookie is considered a first-party cookie. In one embodiment, web browser security policies restrict access to first-party cookies solely to websites within the domain associated with the first-party cookie.

Websites that are not within the domain of card issuer web services 118, in one embodiment, are not aware of, nor provided access to, the tracking cookie. To protect customer privacy and prohibit merchant websites from accessing the tracking cookie, the domains of merchant web services 116 and card issuer web services 118 are distinct. Thus, even though a particular merchant is participating in the customer online data collection of the present invention, the particular merchant is not aware of the tracking cookie, nor does the particular merchant know whether customer online data for customer 122 is being tracked by card issuer web services 118.

In an alternative embodiment, one or more of the domains of merchant web services 116 and card issuer web services 118 are the same. Also, in an alternative embodiment, the tracking cookie may be provided by domains other than the one or more domains of card issuer web service 118. The tracking cookie may also be associated with the domains but not provided by them. Instead, the cookies can be provided by a third party or generated internal to the customer computer system 120. The tracking cookie may also be provided in addition to the domain(s).

Each time the customer 122 logs into web services 118, a check is performed to determine whether the tracking cookie exists on the particular computing device that customer 122 is accessing/navigating card issuer web services 118 through.

If the cookie does not exist, then the tracking cookie containing the unique online user ID (non-PII) and indicating the opt-in/opt-out selection is downloaded to that computing device by card issuer web services 118.

In alternative embodiments, information contained in the tracking cookie may be implemented in more than one cookie. Also, in lieu of an opt-in and/or opt-out selection indication within the tracking cookie, the existence of a tracking cookie on the computing device of customer 122 may itself indicate that the user chose to opt-in and/or opt-out of merchant online tracking.

Prior to aggregating online data at reporting services 112, a set of merchants for collecting the online data is established. Merchant web services 116 represents one or more merchants that have agreed to track and provide online data regarding their customers (e.g., customer 122) through online data collection by card issuer web services 118. The online data collection by card issuer web services 118 is performed by a script that has been downloaded from card issuer web services 118 to a web browser and executed by the customer computer system 120.

Particularly, merchant services 116 are include an instruction within its web pages requesting the web browser operating on the customer computer system 120 to download the script from the card issuer web services 118. As the customer 122 browses a particular merchant website provided by merchant web services 116, the downloaded script is executed in conjunction with the web pages provided by merchant web service 116 to send online data to card issuer web services 118.

When card issuer web services 118 receives a request to download a script, web services 118 determines whether a tracking cookie is present on the particular computing device that the customer 122 is accessing/navigating merchant web services 116 through (e.g., customer computer system 120). In addition to detecting the presence of a tracking cookie, card issuer web services 118 retrieves the unique online user ID (non-PII) stored in each tracking cookie. Also, based upon the particular tracking cookie implementations discussed above, card issuer web services 118 detects whether the customer 122 selected to opt-in (or not opt-out) for merchant online tracking.

If card issuer web services 118 detects a tracking cookie and the tracking cookie indicates that the customer 122 selected to opt-in (or not opt-out) of merchant tracking, then card issuer web services 118 sends the browser on customer computer system 120 a tracking script. The tracking script may be written in JAVA, JAVA script, ActiveX, etc. or in any other language/format suitable for being integrated with the one more websites/web pages provided by merchant web services 116. The tracking script is loaded by, and is executed in conjunction with, the one or more web pages provided by merchant web services 116. At customer computer system 120, the tracking script tracks online data of customer 122 while customer 122 browses the one or more web sites provided by merchant web services 116. In turn, the tracking script communicates the online data of customer 122 to card issuer web services 118.

Online data includes, for example, the products viewed, the products selected for purchase, products abandoned prior to checkout, the amount of time spent viewing particular products, the particular searches and categories viewed, metrics of interest for helping merchants or other organizations improve click-through and conversion rates on their websites.

The tracked online data is stored in a tracking record created by card issuer web services 118. Card issuer web services 118 retrieves the unique online user ID (non-PII) contained in the tracking cookie of the customer 122 and stores it in the tracking record. Thus, the tracking record contains the online data of customer 122 and the unique online user ID (non-PII) of customer 122.

Card issuer web services 118 sends the tracking record to reporting services 112. One or more tracking records are sent in real-time, on-demand, and/or at scheduled intervals, at scheduled times, at data collection/aggregation thresholds, etc., as desired.

For each tracking record received, reporting services 112 translates the unique online user ID in the received tracking record to the hash number (non-PII) associated with that unique online user ID using the non-PII key-code stored in non-PII datastore 114. Reporting services 112 associates each tracking record with the appropriate demographic and transaction data stored in non-PII datastore 114 by matching the hash numbers (non-PII) of each. The tracking record is stored in non-PII datastore 114 by reporting services 112. Accordingly, the tracking record of customer 122, and the demographic and transaction data of each customer 122 are associated without using PII data.

Reporting services 112 generate reports and provides services based on the tracking records, and associated demographic and transaction data stored in non-PII datastore 114. None of the reports generated can contain PII data because reporting services 112 is not privy to PII data. FIG. 3, shows an example report 308.

FIG. 2 illustrates a privacy data receiving process 200, in accordance with an embodiment of the present invention. Generally, process 200 communicates demographic and transaction data from customer data services 104 to reporting services 112 after the data is processed by PII privacy services 108, in an example embodiment. As explained above, the customer data services 104 can be associated with one or more organizations.

In block 201, the customer data services 104 creates a card key-code including PII data elements and non-PII data elements for a set of customers. As described above, FIG. 2 includes an example card key-code 207, where the PII data element is a card number of a customer and the non-PII data element is a unique online user ID of the customer, such as the unique online user ID described with regard to FIG. 1. The respective PII and non-PII data elements of a particular customer are associated in the card key-code.

The unique online user IDs for the customers are preferably not known outside the customer data services 104 and the PII privacy services 108. Hence, external to those services, mere possession of a unique online user ID alone does not allow a particular customer to be identified.

At block 202, for each customer, the customer data services 104 associates at least one PII data element of the card key-code with demographic and transaction data. In turn, the customer data services 104 send the card key-code and the now associated demographic and transaction data to the PII privacy services 108, as shown at block 203.

At block 204, the PII privacy services 108 converts the received card key-code into a non-PII key-code. The non-PII key-code does not include any PII data elements.

The conversion includes replacing the one or more PII data elements of each customer included in the card key-code with a hash number not known to the customer data services 104, and associating each respective non-PII data element the card key-code previously associated to the one or more respective PII data elements, with a respective hash number. Block 208 contains a non-PII key-code example, where the non-PII data element included from the card key-code is a unique online user ID.

At block 205, PII privacy services 108 associate the demographic and transaction data received from the customer data services 104 with a respective hash number, in lieu of the previously associated respective PII data element. The PII privacy services 108 send the non-PII key-code and associated demographic and transaction data to the reporting server, as shown at block 206.

FIG. 3 illustrates an online data receiving and reporting process 300, in accordance with an embodiment of the present invention. Generally, process 300 communicates customer online data from a server to reporting services 112. The online data is associated with demographic and transaction data by the reporting services 112, and a report based on the online, demographic, and transaction data is created.

In block 301, a server sends online data to reporting services 112. The online data includes data derived from customer visits to a merchant web site and, for each customer, an associated a unique online user ID. Block 305 is an example of the online data collected by the server and associated with the unique online user IDs of each customer.

At block 302, the reporting services 112 convert each unique online user ID from the online data to a respective hash number using the associations defined in a non-PII key-code, such as the non-PII key-code described above with reference to FIG. 2. Block 305 includes an example non-PII Key-Code.

In turn, the reporting services 112 associate the online data for each customer with respective demographic and transaction data for each customer by matching the hash numbers associated with each, as shown at block 303. Block 307 is an example of the demographic and transactional data. In block 304, reporting services analyzes the now associated online data, demographic data, and transaction data to generate aggregated reports. Block 308 includes a sample aggregate report.

The present invention (i.e., system 100, processes 200 and 300, or any part(s) or function(s) thereof) may be implemented using hardware, software or a combination thereof and may be implemented in one or more computer systems or other processing systems. However, the manipulations performed by the present invention were often referred to in terms, such as adding or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices.

Figure 4:
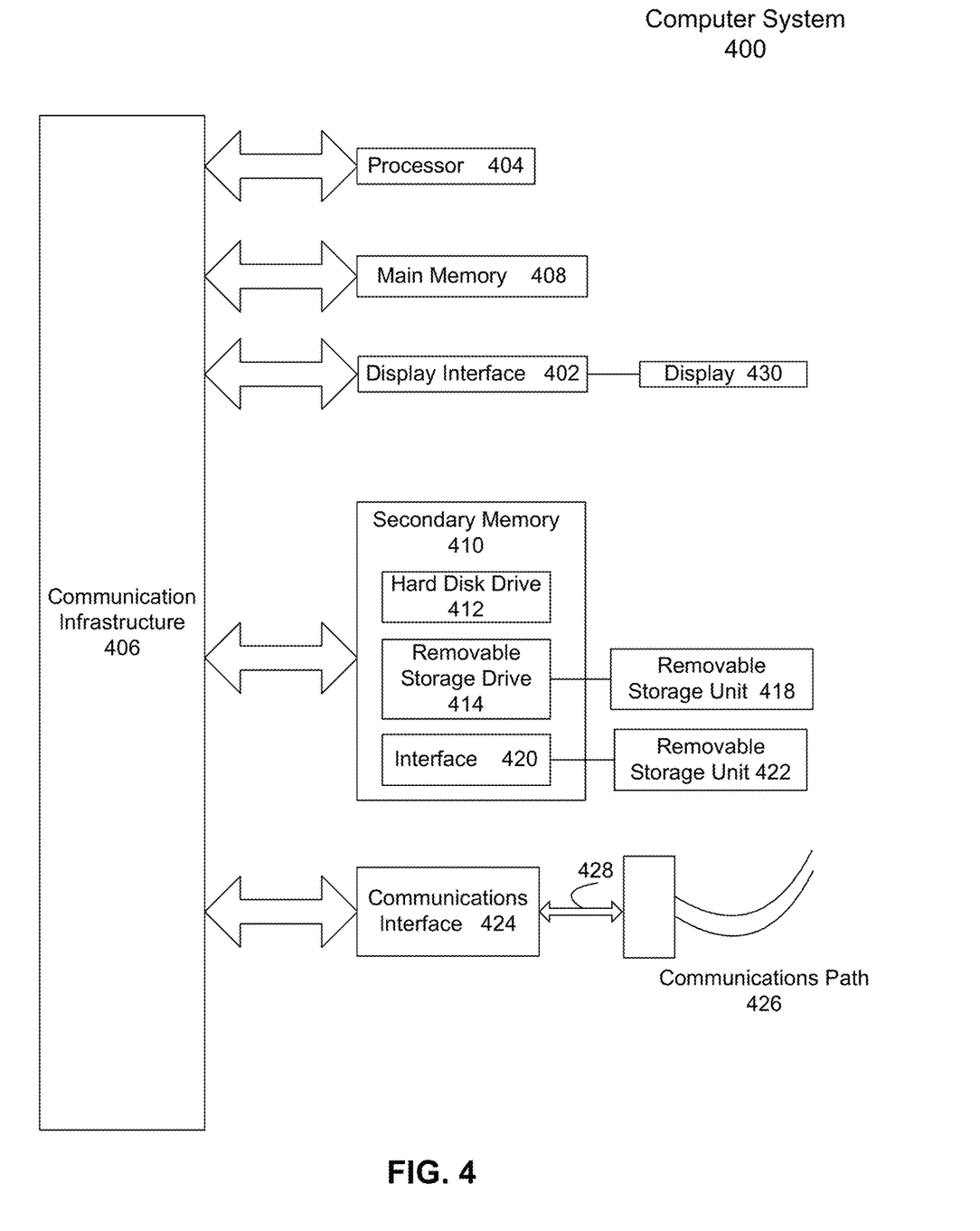
FIG. 4 is a block diagram of an exemplary computer system useful for implementing the present invention.

In fact, in one embodiment, the invention is directed toward one or more computer systems capable of carrying out the functionality described herein. An example of a computer system 400 is shown in FIG. 4.

The computer system 400 (which may take the form of a main frame computer) includes one or more processors, such as processor 404. The processor 404 is connected to a communication infrastructure 406 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 400 can include a display interface 402 that forwards graphics, text, and other data from the communication infrastructure 406 (or from a frame buffer not shown) for display on the display unit 430.

Computer system 400 also includes a main memory 408, preferably random access memory (RAM), and may also include a secondary memory 410. The secondary memory 410 may include, for example, a hard disk drive 412 and/or a removable storage drive 414, representing a floppy disk drive, a magnetic tape drive, an optical disk drive, etc. The removable storage drive 414 reads from and/or writes to a removable storage unit 418 in a well known manner. Removable storage unit 418 represents a floppy disk, magnetic tape, optical disk, etc. which is read by and written to by removable storage drive 414. As will be appreciated, the removable storage unit 418 includes a computer usable storage medium having stored therein computer software and/or data.

In alternative embodiments, secondary memory 410 may include other similar devices for allowing computer programs or other instructions to be loaded into computer system 400. Such devices may include, for example, a removable storage unit 422 and an interface 420. Examples of such may include a program cartridge and cartridge interface (such as that found in video game devices), a removable memory chip (such as an erasable programmable read only memory (EPROM), or programmable read only memory (PROM)) and associated socket, and other removable storage units 422 and interfaces 420, which allow software and data to be transferred from the removable storage unit 422 to computer system 400.

Computer system 400 may also include a communications interface 424. Communications interface 424 allows software and data to be transferred between computer system N00 and external devices. Examples of communications interface 424 may include a modem, a network interface (such as an Ethernet card), a communications port, a Personal Computer Memory Card International Association (PCMCIA) slot and card, etc. Software and data transferred via communications interface 424 are in the form of signals 428 which may be electronic, electromagnetic, optical or other signals capable of being received by communications interface 424. These signals 428 are provided to communications interface 424 via a communications path (e.g., channel) 426. This channel 426 carries signals 428 and may be implemented using wire or cable, fiber optics, a telephone line, a cellular link, a radio frequency (RF) link and other communications channels.

In this document, the terms "computer program medium" and "computer usable medium" are used to generally refer to media such as removable storage drive 414, a hard disk installed in hard disk drive 412, and signals 428. These computer program products provide software to computer system 400. The invention is directed to such computer program products.

Computer programs (also referred to as computer control logic) are stored in main memory 408 and/or secondary memory 410. Computer programs may also be received via communications interface 424. Such computer programs, when executed, enable the computer system 400 to perform the features of the present invention, as discussed herein. In particular, the computer programs, when executed, enable the processor 404 to perform the features of the present invention. Accordingly, such computer programs represent controllers of the computer system 400.

In an embodiment where the invention is implemented using software, the software may be stored in a computer program product and loaded into computer system 400 using removable storage drive 414, hard drive 412 or communications interface 424. The control logic (software), when executed by the processor 404, causes the processor 404 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures and screen shots illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

What is claimed is:

1. A computer implemented method comprising:
   replacing, by a computer-based system, a card number with a first hash code in a card key-code; and
   transmitting, by the computer-based system, transaction data for a first user identification (ID), the first user ID, and the first hash code to a first service that is remote from the computer based system, wherein the first service stores an association between the transaction data and online data of a consumer, in response to the first hash code matching a second hash code, and the first service receives the online data and the first user ID from different entities.

2. The method of claim 1, wherein the online data identifies items selected for eventual purchase that have not yet been purchased.

3. The method of claim 1, wherein the online data includes browsing history of the consumer.

4. The method of claim 1, wherein the first hash code is not communicated outside the computer-based system and the first service.

5. The method of claim 1, further comprising generating, by the computer-based system, the card key-code.

6. The method of claim 1, wherein the first service does not have access to a transaction account code associated with the consumer.

7. The method of claim 1, wherein the computer-based system does not have access to the online data.

8. The method of claim 1, further comprising associating the first hash code with the first user ID of the consumer.

9. The method of claim 1, further comprising associating the first hash code with the first user ID of the consumer by inserting the first hash code in the card key-code.

10. The method of claim 1, wherein the second hash code is retrieved by the first service based at least in part on a second user ID associated with the online data.

11. The method of claim 1, further comprising generating, by the computer-based system, the first hash code.

12. The method of claim 1, wherein the first service further associates the online data with demographic data, in response to the first hash code matching the second hash code.

13. The method of claim 1, wherein the online data identifies an abandoned online shopping cart of the consumer.

14. The method of claim 1, wherein a transaction account code associated with the consumer comprises personally identifiable information (PII) and the first user ID comprises non-personally identifiable information (non-PII).

15. The method of claim 14, wherein the first service generates a report based at least in part on online data, wherein the PII is not accessed by the first service during the generating.

16. The method of claim 14, further comprising enforcing, by the computer-based system, a security policy that restricts the first service from accessing the PII.

17. A system comprising:
a processor; and
a tangible, non-transitory memory configured to communicate with the processor, the tangible, non-transitory memory having instructions stored thereon that, in response to execution by the processor, cause the processor to perform operations comprising:
replacing, by the processor, a card number with a first hash code in a card key-code; and
transmitting, by the processor, transaction data for a first user identification (ID), the first user ID, and the first hash code to a first service that is remote from the processor, wherein the first service stores an association between the transaction data and online data of a consumer, in response to the first hash code matching a second hash code, and the first hash code is not communicated outside the computer-based system and the first service.

18. The system of claim 17, wherein the first service receives the online data and the first user ID from different entities.

19. The system of claim 17, wherein the online data identifies an abandoned online shopping cart of the consumer.

20. An article of manufacture including a non-transitory, tangible computer-readable storage medium having instructions stored thereon that, in response to execution by a computer-based system, cause the computer-based system to perform operations comprising:
replacing, by the computer-based system, a card number with a first hash code in a card key-code; and
transmitting, by the computer-based system, transaction data for a first user identification (ID), the first user ID, and the first hash code to a first service that is remote from the computer based system, wherein the first service stores an association between the transaction data and online data of a consumer, in response to the first hash code matching a second hash code, and the first service further associates the online data with demographic data, in response to the first hash code matching the second hash code.

* * * * *